United States Patent [19]
Khan

[11] 3,739,488
[45] June 19, 1973

[54] HEATED SAND DRYER
[75] Inventor: Amir U. Khan, Okemos, Mich.
[73] Assignee: The United States of America as represented by the Secretary of State and the Secretary of Agriculture, Washington, D.C.
[22] Filed: Nov. 26, 1971
[21] Appl. No.: 202,120

[30] Foreign Application Priority Data
Nov. 26, 1970 Philippines............................ 11989

[52] U.S. Cl. ........................ 34/95, 34/71, 34/183, 432/112
[51] Int. Cl. ........................................... F26b 13/26
[58] Field of Search ................. 34/60, 70, 71, 135, 34/136, 179, 182, 183; 263/32 B, 34

[56] References Cited
UNITED STATES PATENTS
1,773,202  8/1930  Rosenfield ........................... 34/183
1,623,017  3/1927  Christoph .............................. 34/71
832,961   10/1906  Elkus .................................... 34/136
1,230,684  6/1917  Dance .................................... 34/137
3,588,061  6/1971  Boguslavsky ...................... 263/32 B Primary Examiner—Kenneth W. Sprague
Assistant Examiner—James C. Yeung
Attorney—R. Hoffman

[57] ABSTRACT

A dryer for agricultural crops, such as rice, corn, sorghum, or the like is disclosed in which the crop to be dried is mixed with heated sand in a mixing zone of a rotating cylinder, then transferred to a drying zone of the cylinder, and finally to a separating zone. The sand is returned to a pan beneath the cylinder to be reheated.

6 Claims, 4 Drawing Figures

HEATED SAND DRYER

A nonexclusive, irrevocable, royalty-free license in the invention herein described, throughout the world for all purposes of the United States Government, with power to grant sublicenses for such purposes, is hereby granted to the Government of the United States of America.

This invention relates to dryers for drying any material and more particularly to a dryer for agricultural crops wherein the grain or other crops while passing through a drying cylinder comes in contact with a hot granulated drying agent and thereby reducing the moisture content of said material to be dried.

Agricultural crop such as rice, corn, sorghum and the like is harvested usually containing high moisture anywhere from 18 to 35 percent and it is necessary to treat the crop in a manner to reduce the moisture for proper storage to 14 to 16 percent. A traditional method for reducing the moisture is by exposing the crop to sunlight by spreading on drying floors.

Modern methods utilize air that is often pre-conditioned as regards to relative humidity and temperature before passing said air into a mass of said crop. While the modern method of moisture reduction is more desirable than the traditional method, it is however not generally suitable for small scale operations. The slow rate of drying of heated-air dryers requires larger-sized drying equipment involving substantial capital investments and necessitates multipass drying with continuous flow drier. Moreover, modern dryers are complicated and too dependent on skilled service and maintenance.

To obviate the foregoing disadvantages, a novel dryer is provided. According to the present invention, a rotating drying cylinder that is internally divided into a mixing, drying and separating zones is mounted on bearings atop a semicircular pan. The pan contains a granulated material and has provisions for heating the said granulated material and for controlling its temperature. In the mixing zone of the drying cylinder, the moist crop and the heated granulated drying agent are introduced and are mixed. The mixture is vigorously tumbled and moved along the drying zone until the granulated drying agent and the crop is caused to separate in the separating zone. The granulated drying agent drops into the heated pan to be reheated and recycled for subsequent introduction into the mixing zone of the rotating drying cylinder. The dried crop material however continues to be moved longitudinally toward the end of the drying cylinder until it falls through an outlet into a container.

Accordingly, it is one object of the invention to provide a dryer designed to keep the material in motion while mixed with a granulated drying agent so that the material is divested of excess moisture by the time it leaves the dryer.

Another object of the present invention is to provide a dryer which makes possible the fast and low-cost drying of agricultural crop by transferring heat by the conduction methods.

Still another object of the present invention is to provide a dryer which is of simple construction and inexpensive to manufacture.

Still another object is to provide a dryer which is easy to use, entirely efficient and effective in operation.

While some of the more salient features and characteristics of the instant invention have been pointed out, others will become apparent as the specification proceeds taken in connection with the accompanying drawings in which.

Figure 1:
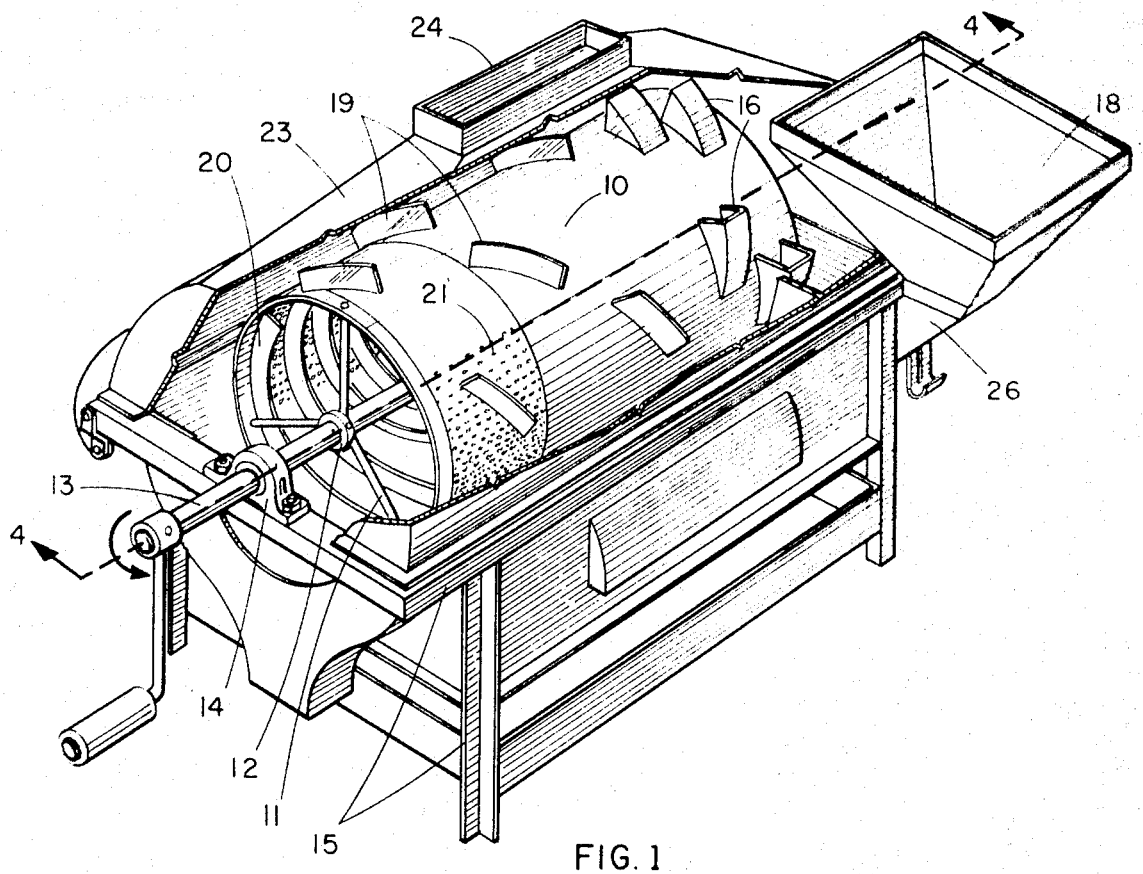
FIG. 1 is a perspective view of the dryer of this invention
Figure 2:
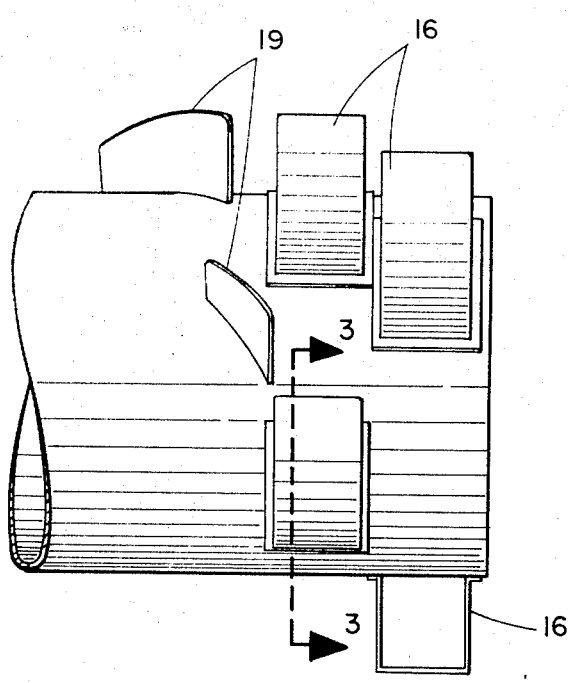
FIG. 2 is a fragmentary view of the cylinder showing the pick-up scoops
Figure 3:
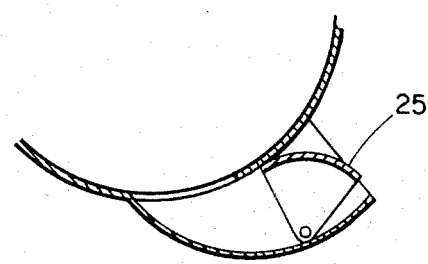
FIG. 3 is a cross-sectional view of the scoop taken along lines 3—3
Figure 4:
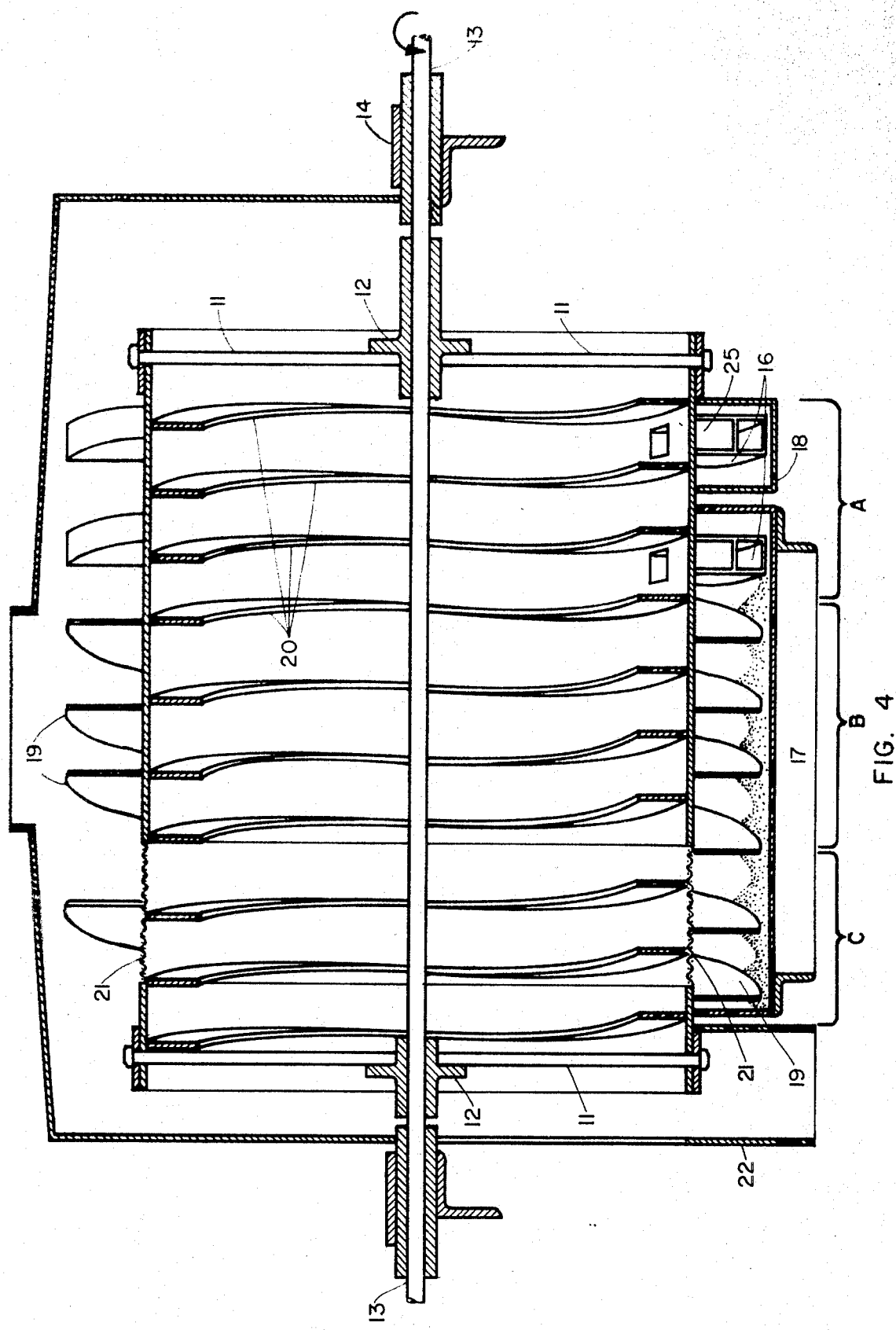
FIG. 4 is a cross-sectional view of the drying chamber along lines 4—4

As shown in FIG. 1, a preferred embodiment of the dryer comprises of a cylindrical shell (10) fitted with one continuous spiral member to form a kind of an internal auger. Spiders (11) provided at the ends of the shell together with the hubs (12) attached respectively thereto supports the cylinder shell (10) through shaft (13) which is journalled by suitable bearings (14) mounted on frames (15). One end of the shaft (13) is extended to permit any drive means to be attached thereon to rotate the cylindrical shell (10). The cylindrical shell (10) may also be provided with a cover (23) having thereon chimney (24) and a heat pan (17).

The cylindrical shell (10) is divided into three zones: the mixing zone; drying zone; and the separating zone. Two sets of pick-up scoops (16) are provided along the outside wall of the mixing zones. The pick-up scoop (16) on the mixing zone is provided with adjustable or fixed openings (25) and said scoops provide uninterrupted passage for introducing the heated granulated drying agent into the drying chamber. The drying agent in accordance with this invention is ordinary sand however any particulate material such as gravel, glass beads, metal balls, filings and the like may also be used.

Identical scoops which are in material communication with hopper (18) are also provided along the mixing zone for introducing moist material into the mixing zone of said cylindrical shell (10) from the moist material trough (26).

A plurality of fins (19) is further provided on the outside of the cylindrical shell (10). The fins (19) extends radially outwardly of the outside wall of said cylindrical shell and are mounted at an angle with the longitudinal axis of the shell to form therewith a continuous or interrupted spiral flights. The fins moves the granulated drying agent rearwardly longitudinally along the pan (17) towards the pick-up scoops (16) for subsequent introduction of the granulated drying agent into the mixing zone of the cylindrical shell (10).

The drying zone (B) is adjacent and contiguous to the mixing zone (A). The spiral (20) moves the mixture progressively forwardly in the drying zone (A) towards the separating zone (C). Furthermore the inside wall of the cylindrical shell is provided with convolutions or short baffles to vigorously tumble the mixture of hot particulate drying agent and moist crop material to effect rapid moisture reduction.

At one end of the cylinder is the separating zone (C) which comprises of a perforate screen (21) with perforations smaller than the crop grains. The perforations however allow the passage of the particulate drying agent which is smaller in grain size than the material being dried. The dried crop is retained in the cylinder and is moved by the spiral (20) towards the end of the cylinder wherein it falls through the grain outlet (22) into a container.

The granulated drying agent that falls from the separating zone is collected in the heat pan (17) wherein it is reheated while moving longitudinally rearwardly due to the action of the fins (19). The heat pan can be heated by any means and by any fuel, such as for example liquid petroleum gas, ordinary wood, rice hulls, coal, kerosene, other low quantity fuel or electricity.

From the preceding description it will be gathered that my invention provides a novel dryer and that various changes and modifications may be resorted to without departing from the scope of the appended claims.

What I claim and desire to protect by Letters Patent is:

1. A conduction dryer comprising:
   a. a rotatable cylindrical drying chamber;
   b. means for rotating said cylindrical chamber connected thereto;
   c. a plurality of scoops mounted on the outside wall of the cylindrical chamber for introducing moist material to be dried into said chamber;
   d. means for introducing a heated granulated drying agent into the chamber;
   e. means for continuously mixing and tumbling the material to be dried with the granulated drying agent;
   f. means for moving the mixture of moist material and granulated drying agent axially through the cylindrical chamber; and
   g. means for separating granulated drying agent from dried material.

2. A dryer according to claim 1 wherein it is provided thereon with scoops constructed and arranged to provide passage for the granulated drying agent into the inside portion of said drying chamber 3. A dryer according to claim 2 wherein the cylindrical shell is provided with plates helically mounted around the inside wall of said cylindrical shell to form an internal auger type conveyor.

4. A dryer according to claim 3 wherein a plurality of fins mounted at an angle with the longitudinal axis is provided on the outside wall of said cylindrical shell to move the granulated drying agent in the pan.

5. A dryer according to claim 4 wherein the part of the discharge end of said cylindrical shell comprises of perforate screens.

6. A dryer according to claim 5 wherein a pan for the granulated drying agent is provided immediately below the perforate screen and extending beyond to the drying agent pick-up scoop; said pan being adapted and constructed to cover a circumferential portion of the cylindrical shell.

* * * * *